(12) United States Patent
Maeda (10) Patent No.: US 9,308,912 B2
(45) Date of Patent: Apr. 12, 2016

(54) DRIVING FORCE CONTROL SYSTEM

(75) Inventor: Yoshinori Maeda, Aichi-gun (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 1044 days.

(21) Appl. No.: 12/741,953

(22) PCT Filed: Nov. 7, 2008

(86) PCT No.: PCT/JP2008/070270
§ 371 (c)(1),
(2), (4) Date: May 7, 2010

(87) PCT Pub. No.: WO2009/060928
PCT Pub. Date: May 14, 2009

(65) Prior Publication Data
US 2010/0241304 A1    Sep. 23, 2010

(30) Foreign Application Priority Data
Nov. 9, 2007    (JP) .................... 2007-292480

(51) Int. Cl.
*B60W 30/02* (2012.01)
*B60K 6/48* (2007.10)
(Continued)

(52) U.S. Cl.
CPC .............. *B60W 30/02* (2013.01); *B60K 6/48* (2013.01); *B60K 6/52* (2013.01); *B60K 7/0007* (2013.01);
(Continued)

(58) Field of Classification Search
CPC ..... B60W 30/02; B60W 10/08; B60W 10/16; B60W 10/06; B60W 2720/14; B60W 20/00; B60W 2520/10; B60W 2510/087; B60W 2510/1075; B60K 6/52; B60K 17/356; B60K 23/04; B60K 7/0007; B60K 6/48; B60K 2007/0038; B60K 1/02; B60K 2001/001; B60K 2007/0092; F16H 48/10; F16H 48/22; F16H 48/30; F16H 48/36; F16H 2048/368; F16H 59/72; F16H 2048/204; B60L 15/20; B60L 15/2036; B60L 2240/425; B60L 2220/44; Y02T 10/7275; Y02T 10/648; Y02T 10/6221; Y02T 10/6286; Y02T 10/6265; Y02T 10/646
USPC ............................. 701/36, 41–42, 48, 67–69; 180/233–234, 245–246
See application file for complete search history.

(56) References Cited

U.S. PATENT DOCUMENTS 5,058,700 A * 10/1991 Shibahata .................. 180/245
5,376,868 A * 12/1994 Toyoda et al. ............. 318/587
(Continued)

FOREIGN PATENT DOCUMENTS

| JP | 2000 82198 | 3/2000 |
|---|---|---|
| JP | 2000 94979 | 4/2000 |

(Continued)

*Primary Examiner* — John Q Nguyen
*Assistant Examiner* — Michael Kerrigan
(74) *Attorney, Agent, or Firm* — Oblon, McClelland, Maier & Neustadt, L.L.P.

(57) ABSTRACT

A drive force control system capable of stabilizing behavior of a vehicle with a rapid control response. The drive force control system for a vehicle having a pair of front wheels and a pair of rear wheels includes: a distribution mechanism, which distributes power outputted from a prime mover to a right wheel and to a left wheel of any one of the pairs of front and rear wheels, and which changes a ratio to distribute the power to the right wheel and the left wheel by engaging or disengaging an engagement mechanism; and at least two motors arranged individually for a right wheel and a left wheel of other pair of wheels to control drive forces for driving those right wheel and left wheel individually.

8 Claims, 5 Drawing Sheets

(51) Int. Cl.

| | | |
|---|---|---|
| *B60K 6/52* | (2007.10) | |
| *B60K 7/00* | (2006.01) | |
| *B60K 17/356* | (2006.01) | |
| *B60K 23/04* | (2006.01) | |
| *B60L 15/20* | (2006.01) | |
| *B60W 10/06* | (2006.01) | |
| *B60W 10/08* | (2006.01) | |
| *B60W 10/16* | (2012.01) | |
| *F16H 48/10* | (2012.01) | |
| *F16H 48/22* | (2006.01) | |
| *F16H 48/30* | (2012.01) | |
| *F16H 48/36* | (2012.01) | |
| *B60K 1/02* | (2006.01) | |
| *B60K 1/00* | (2006.01) | |
| *B60W 20/00* | (2006.01) | |
| *F16H 59/72* | (2006.01) | |
| *F16H 48/20* | (2012.01) | |

(52) U.S. Cl.
CPC .......... *B60K 17/356* (2013.01); *B60K 23/04* (2013.01); *B60L 15/20* (2013.01); *B60L 15/2036* (2013.01); *B60W 10/06* (2013.01); *B60W 10/08* (2013.01); *B60W 10/16* (2013.01); *F16H 48/10* (2013.01); *F16H 48/22* (2013.01); *F16H 48/30* (2013.01); *F16H 48/36* (2013.01); *B60K 1/02* (2013.01); *B60K 2001/001* (2013.01); *B60K 2007/0038* (2013.01); *B60K 2007/0092* (2013.01); *B60L 2220/44* (2013.01); *B60L 2240/425* (2013.01); *B60W 20/00* (2013.01); *B60W 2510/087* (2013.01); *B60W 2510/1075* (2013.01); *B60W 2520/10* (2013.01); *B60W 2720/14* (2013.01); *F16H 59/72* (2013.01); *F16H 2048/204* (2013.01); *F16H 2048/368* (2013.01); *Y02T 10/6221* (2013.01); *Y02T 10/6265* (2013.01); *Y02T 10/6286* (2013.01); *Y02T 10/646* (2013.01); *Y02T 10/648* (2013.01); *Y02T 10/7275* (2013.01)

(56) References Cited

U.S. PATENT DOCUMENTS

| | | | | |
|---|---|---|---|---|
| 5,701,247 | A | * | 12/1997 | Sasaki ............................ 701/1 |
| 6,081,042 | A | * | 6/2000 | Tabata et al. .................... 290/45 |
| 6,360,150 | B1 | * | 3/2002 | Fukushima et al. ............ 701/41 |
| 6,539,298 | B2 | * | 3/2003 | Inagaki et al. .................. 701/70 |
| 7,007,763 | B2 | * | 3/2006 | Ginther et al. .................. 180/6.2 |
| 7,643,922 | B2 | * | 1/2010 | Motoyama ...................... 701/48 |
| 2002/0035002 | A1 | * | 3/2002 | Ishikawa et al. ............. 475/203 |
| 2007/0213913 | A1 | * | 9/2007 | Ushiroda et al. ................ 701/82 |
| 2008/0071451 | A1 | * | 3/2008 | Yamaguchi et al. ............ 701/69 |
| 2009/0108671 | A1 | * | 4/2009 | Maeda et al. .................. 303/146 |
| 2010/0203999 | A1 | * | 8/2010 | Yokoo et al. .................. 475/223 |

FOREIGN PATENT DOCUMENTS

| | | |
|---|---|---|
| JP | 2007 127145 | 5/2007 |
| JP | 2007 190942 | 8/2007 |
| JP | 2007 276689 | 10/2007 |

\* cited by examiner

Fig. 5

DRIVING FORCE CONTROL SYSTEM

TECHNICAL FIELD

This invention relates to a control system for controlling drive force of a vehicle, and more particularly, to a control system adapted to control the drive force for driving both right and left wheels thereby generating yaw moment on a vehicle.

BACKGROUND ART

In a vehicle having four wheels, rear wheels or front wheels are used as driving wheels, and power of a prime mover such as an engine is transmitted thereto. Meanwhile, in case the vehicle is a four-wheel drive vehicle, power outputted from the prime mover is transmitted to all of the four wheels. In order to ensure running stability of the vehicle, the driving forces for driving the driving wheels are equalized in case the vehicle is running straight ahead. However, in order to maintain the stability of the vehicle in case frictional coefficients of a road surface against the left and drive wheels are different from each other, or in order to enhance turning characteristics of the vehicle utilizing a yaw moment, the driving forces for driving the driving wheels are controlled to increase the yaw moment.

For example, Japanese Patent Laid-Open No. 2007-127145 discloses an apparatus for controlling driving forces for driving right and left wheels. Specifically, according to the teachings of Japanese Patent Laid-Open No. 2007-127145, power generated by a driving power source such as an engine is distributed to the right and left driving wheels, and a speed reducing mechanism and a clutch are arranged individually between the right wheel and a motor and between the motor and the left wheel. Therefore, the power outputted from the engine is distributed and transmitted to those wheels. Meanwhile, power of the motor is transmitted to any one of the right and left driving wheels by engaging any of the clutches. Consequently, a difference between the driving forces for driving the right and left driving wheels is widened. In other words, a substantial distribution rate can be altered depending on a situation.

Meanwhile, Japanese Patent Laid-Open No. 2000-94979 discloses a vehicle in which any one of the pairs of front and rear wheels are driven by an engine, and the other pair of wheels are driven by a motor. Because a response of the motor is more rapid than that of the engine in case of controlling drive force and braking force, according to the teachings of Japanese Patent Laid-Open No. 2000-94979, the drive force and the braking force are compensated by the motor.

According to the apparatus taught by Japanese Patent Laid-Open No. 2007-127145, the difference between the drive forces for driving the right and the left wheels are controlled by engaging or disengaging the clutch to apply a motor torque to one of the right and the left wheels, or to stop applying the motor torque. The clutch is conventionally engaged and disengaged hydraulically, however, such a hydraulic clutch control may be delayed inevitably. Therefore, in order to control a behavior of the vehicle such as a yawing accurately, such control of the clutch has been required to be improved.

For example, a quick-fill for applying oil pressure rapidly in the beginning of the hydraulic control, a phase-lead control and so on are known in the art as a solution to avoid a delay in the hydraulic clutch control. However, although transient response of those controls is excellent, a control amount of those controls may be fluctuated in case a control input is varied drastically. Therefore, stability of those controls has to be improved.

DISCLOSURE OF THE INVENTION

The present invention has been conceived noting the technical problems thus far described, and its object is to improve a responsiveness of the control entirely in a vehicle while ensuring stability.

In order to achieve the above-mentioned object, according to the present invention, there is provided a drive force control system for a vehicle having a pair of front wheels and a pair of rear wheels, comprising: a distribution mechanism, which distributes power outputted from a prime mover to a right wheel and to a left wheel of any one of said pairs of front and rear wheels, and which changes a ratio to distribute the power to those right and left wheels by engaging or disengaging an engagement mechanism; and at least two motors arranged individually for a right and a left wheels of the other pair of wheels to control drive forces for driving those right and left wheels individually.

According to the present invention, the above-mentioned motor includes an in-wheel motor, which is arranged individually in the right and the left wheels of said other pair of wheels to drive those right and left wheels directly.

The drive force control system of the present invention further comprises: a means which calculates a target yaw moment of the vehicle; and a means which differentiates the drive forces for driving the right and the left wheels of said other pair of wheels by the motor thereby approximating an actual yaw moment to the calculated target yaw moment.

In addition, the drive force control system of the present invention further comprises: a means which calculates a deficiency of a difference between the drive forces for driving the right and the left wheels of said one of the pairs of wheels resulting from a delay in changing such a difference therebetween by actuating the engagement mechanism; and a means which sets a difference between the drive forces for driving the right and the left wheels of said other pair of wheels, thereby compensating the calculated deficiency of the difference between the drive forces for driving the right and the left wheels of said one of the pairs of wheels resulting from a delay in changing such a difference therebetween.

According to the present invention, the means which calculates a deficiency of the difference between the drive forces for driving the right and the left wheels of said one of the pairs of wheels resulting from a delay in changing such a difference therebetween includes a means which calculates a yaw moment corresponding to a difference between the target yaw moment of the vehicle and a yaw moment achieved by the distribution mechanism by actuating the engagement mechanism to achieve the target yaw moment.

In addition, the drive force control system of the present invention further comprises: a means which calculates a target yaw moment of the vehicle; and a means which differentiates the drive forces for driving the right and the left wheels of said other pair of wheels to achieve the target yaw moment by the motor instead of the distribution mechanism, in case the calculated target yaw moment is larger than a yaw moment settable by differentiating the driving forces for driving the right and the left wheels of said one of the pairs of wheels using the distribution mechanism.

According to the present invention, therefore, the distribution ratio of the distribution mechanism is varied by engaging or disengaging the engagement mechanism, and as a result, the difference between the drive forces for driving the right wheel and the left wheel of any one of the pairs of front and rear wheels is varied. Meanwhile, the right wheel and the left wheel of the other pairs of front and rear wheels are individually provided with the motor to be driven. Therefore, the difference between the drive forces for driving the right wheel and the left wheel of the other pair of wheels is varied by changing the power of those motors. Thus, the driving forces for driving the right wheels and the left wheels can be varied by the distribution mechanism and the motors. Specifically, the distribution ratio of the distribution mechanism is changed by actuating the engagement mechanism. On the other hand, the driving forces of the motors for driving the right and the left wheels can be varied immediately by changing the outputs of the motor. Therefore, according to the present invention, a responsiveness of the control of the driving forces for driving the right and the left wheels can be improved.

As described, according to the present invention, the driving forces for driving the right and the left wheels of the other pair of the wheels are controlled individually by the in-wheel motors arranged in each wheel. That is, the driving forces for driving the right and left wheel provided with the motor can be controlled directly. Therefore, in addition to the above-mentioned advantage, the responsiveness of the control of the driving forces can be further improved.

For example, in case of controlling the driving forces for driving the right and the left wheels to achieve the target yaw moment, according to the present invention, the driving forces for driving the right and the left wheels provided with the motor are controlled individually by the motors. Therefore, the responsiveness of the yaw moment control can be improved.

In case the difference between the drive forces for driving the right and the left wheels differentiated by the distribution mechanism is insufficient to achieve the desired yaw moment, according to the present invention, such deficiency is compensated by controlling the drive forces for driving the right and the left wheels provided with the motor by controlling the motor. Therefore, the responsiveness of the control of the driving forces for driving the right and the left wheels can be further improved. In addition to the above-mentioned advantage, it is unnecessary to control the distribution mechanism excessively. Therefore, the control of the driving forces for driving the right and the left wheels using the distribution mechanism can be stabilized.

Moreover, according to the present invention, insufficiency of the yaw moment control by the distribution mechanism is compensated by controlling the motors. Therefore, responsiveness of the yaw moment control can be improved so that the behavior of the vehicle can be stabilized.

Further, in case the target yaw moment cannot be achieved by controlling the driving forces for driving the right and the left wheels by the distribution mechanism due to an occurrence of a failure of the distribution mechanism or the like, according to the present invention, the yaw moment can be generated by controlling the motors to control the driving forces for driving the right and the left wheels instead of the distribution mechanism. Therefore, the yaw moment of the vehicle can be controlled with a good response even in case the distribution mechanism is in trouble, e.g., even in case a failure of the distribution mechanism occurs.

BEST MODE FOR CARRYING OUT THE INVENTION

The drive force control system of the present invention is to be applied to a vehicle comprising at least four wheels including a pair of front wheels and a pair of rear wheel. That is, the drive force control system may also be applied to a vehicle having more than four wheels, e.g., to a vehicle having six wheels or eight wheels etc. According to the present invention, a power of a main prime mover is transmitted to a right wheel and a left wheel of any one of the pairs of front and rear wheels. The main prime mover is adapted not only to output a power for driving a vehicle but also to output a power for driving a generator and a hydraulic pump. For example, an internal combustion engine adapted to output power by burning liquid fuel or gas, a motor, a hybrid type drive unit adapted to output power while synthesizing powers of an internal combustion engine and a motor can be used as the main prime mover.

The vehicle to which the present invention is applied comprises a distribution mechanism for distributing the power outputted from the main prime mover to the right wheel and to the left wheel. For example, a mechanism capable of performing a differential action such as a differential mechanism, a planetary gear mechanism and so on can be used as the distribution mechanism. The distribution mechanism comprises three rotary elements rotated differentially amongst each other. Specifically, the power outputted form the main prime mover is inputted to one of those rotary elements, and other two elements are connected individually with the right wheel and the left wheel. In order to change a distribution ratio of the mechanism for performing a differential action, the vehicle is provided with an engagement mechanism.

The engagement mechanism is adapted to transmit a torque when engaged, and to interrupt transmission of the torque when disengaged. For example, a frictional clutch can be used as the engagement mechanism, and a positive clutch may also be used as the engagement mechanism. In case of using the frictional clutch as the engagement mechanism, the torque can be transmitted according to a degree of engagement of the frictional clutch. The engagement mechanism may be arranged individually between the element to which the power is inputted and one of the other two elements, and between the element to which the power is inputted and the remaining element of the other two elements. Alternatively, it is also possible to arrange a still another motor for assisting the drive forces driving the right and the left wheels. In this case, the engagement mechanism is arranged individually between the still another motor and one of the other two elements or the right wheel, and between the still another motor and the remaining element of the other two elements and the left wheel.

In order to independently drive a right wheel and a left wheel of the pair of wheels other than the pair of wheels to which the power is transmitted through the distribution mechanism, each of the right wheel and the left wheel are individually provided with a motor. Each motor is connected individually with the right and the left wheel without interposing a selective connecting mechanism such as a clutch therebetween. For example, an in-wheel motor for driving the wheel directly is arranged individually in the right wheel and the left wheel.

The control system of the present invention is to be applied to the vehicle thus has been explained, and adapted to control a difference between driving forces for driving the right wheels and the left wheels thereby achieving a target yaw moment. The target yaw moment can be calculated by a known method. For example, the target yaw moment can be calculated by calculating a target yaw rate on the basis of a vehicle speed and a target stability factor, a wheelbase of the vehicle, a steering angle and so on, and then calculating the target yaw moment on the basis of the calculated target yaw rate, a slip angle, a steering angle and so on.

More specifically, the control system of the present invention is adapted to control the driving forces for driving the right wheel and the left wheel by driving the motors such as the in-wheel motor thereby achieving the target yaw moment of the vehicle thus calculated. In addition, the control system is also capable of differentiating the driving forces for driving the right wheel and the left wheel by actuating the engagement mechanism of the distribution mechanism, in parallel with controlling the yaw moment using the motor. In this case, a response of the motor to control of the driving forces for driving the right and the left wheels is faster than that of the distribution mechanism. Therefore, an insufficiency of the difference between the drive force for driving the right wheel and the drive force for driving the left wheel resulting from a response lag of the distribution mechanism can be compensated by carrying out the aforementioned control using the motors.

Thus, as explained above, the control system according to the present invention is capable of controlling the driving forces for driving the right and the left wheels not only by the distribution mechanism but also by the motors. Therefore, in case the difference between the drive forces cannot be differentiated sufficiently by the distribution mechanism due to trouble of the distribution mechanism or the like, the driving forces for driving the right and the left wheels can be further differentiated by the motors to compensate such deficiency. Alternatively, the driving forces for driving the right and the left wheels can also be differentiated by the motors instead of the distribution mechanism in such case. Thus, according to the present invention, the yaw moment can be controlled even in case the distribution mechanism is in trouble.

Figure 1:
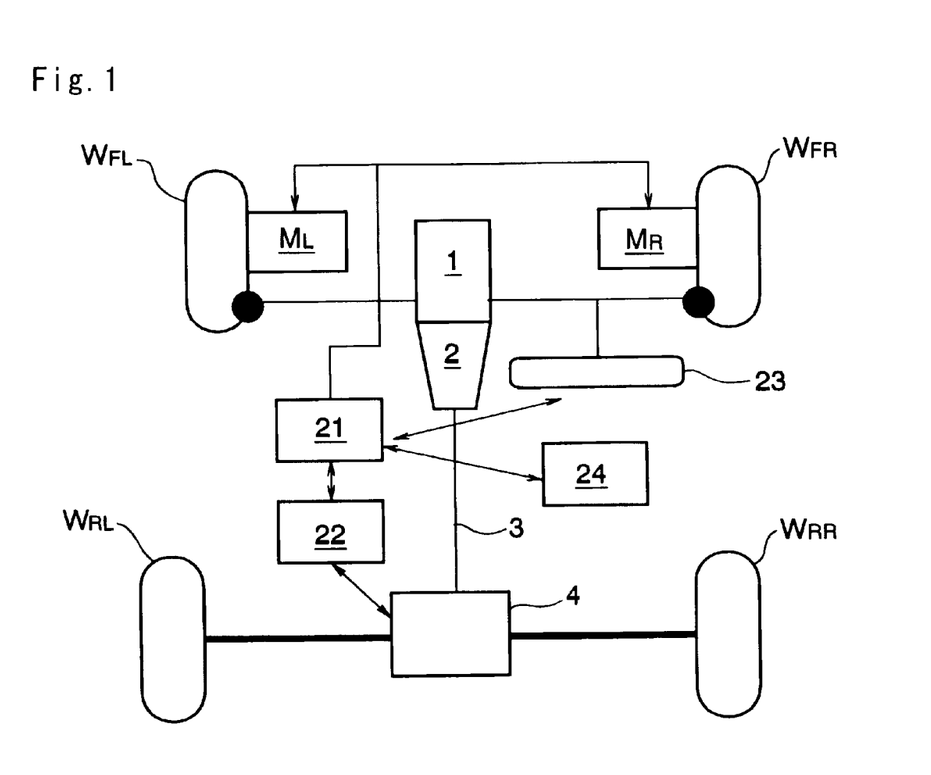
FIG. 1 is a view schematically showing a vehicle to which the present invention is applied.

The vehicle to which the present invention is applied is schematically shown in FIG. 1. Specifically, the vehicle shown in FIG. 1 is an FR (i.e., front engine rear drive vehicle)-based four wheel drive vehicle, in which an engine 1 functioning as a main prime mover is arranged in a front side of the vehicle, and a right rear wheel WRR and a left rear wheel WRL are driven by the engine 1. In the vehicle shown in FIG. 1, a transmission 2 is connected with the engine 1, and the transmission 2 is connected with a differential 4 corresponding to the distribution mechanism of the present invention through a propeller shaft 3.

Figure 2:
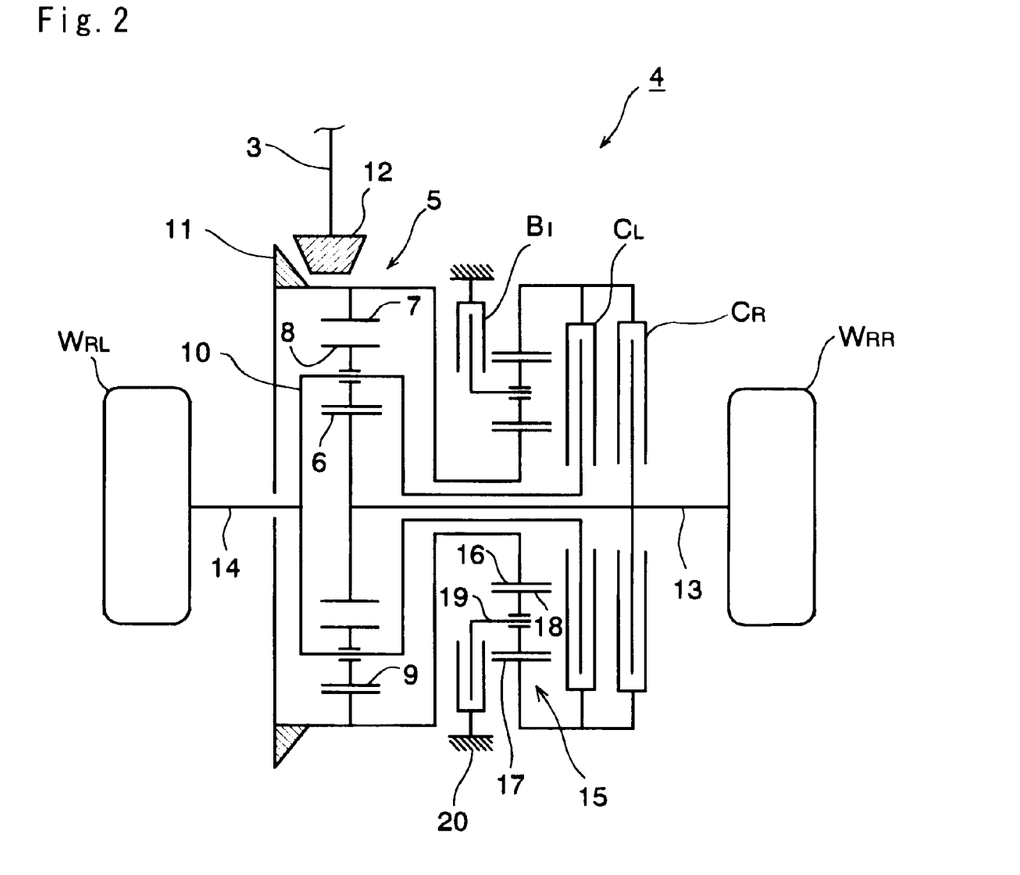
FIG. 2 is a skeleton diagram schematically showing an example of the differential.

The differential 4 is adapted to distribute a power inputted thereto to the rear wheel WRR and to the rear wheel WRL by a differential mechanism thereof, and the differential 4 is capable of varying a distribution ratio of the power. An example of the differential mechanism is illustrated in FIG. 2. In the example shown in FIG. 2, a double pinion type planetary gear mechanism 5 is used as the differential mechanism of the differential 4. As shown in FIG. 2, a ring gear 7 as an internal gear is arranged concentrically with a sun gear 6 as an external gear. A first pinion gear 8 is meshed with the sun gear 6, and a second pinion gear 9 is meshed with the first pinion gear 8 and the ring gear 7. Those pinion gears 8 and 9 are held by a carrier 10 in a rotatable and revolvable manner.

A driven gear 11 is arranged on an outer circumference of the ring gear 7, and a drive gear 12 attached to the propeller shaft 3 is meshed with the driven gear 11. That is, a pair of bevel gears is used as those drive gear 12 and driven gear 11. A drive shaft 13 of the right rear wheel WRR is connected with the sun gear 6, and a drive shaft 14 of the left rear wheel WRL is connected with the carrier 14. Accordingly, the ring gear 7 serves as an input element, and the power inputted to the ring gear 7 is distributed to the right rear wheel WRR and to the left rear wheel WRL through the sun gear 6 and the carrier 10.

In order to control the distribution ratio, there are provided a speed reducing gear mechanism, two clutches, and a brake. In the example shown in FIG. 2, a single pinion type planetary gear mechanism 15 is used as the speed reducing gear mechanism. The planetary gear mechanism 15 comprises a sun gear 16, a ring gear 17 arranged concentrically with the sun gear 16, and a carrier 19 holding a pinion gear 18 meshing with the sun gear 16 and the ring gear 17. A brake B1 for breaking the carrier 19 selectively is arranged between the carrier 19 and a predetermined fixing member 20 such as a casing.

A clutch CR is arranged between the ring gear 17 and the drive shaft 13 of the right rear wheel WRR, and a clutch CL is arranged between the ring gear 17 and the carrier 10 (i.e., the left rear wheel WRL) of the double pinion type planetary gear mechanism 5. Those brake B1 and clutches CR and CL are adapted to transmit the torque by being engaged by an engaging force such as a hydraulic pressure. Especially, a frictional engagement mechanism, which is adapted to transmit the torque by a frictional force, and in which a transmission torque capacity thereof is varied according to an engagement force applied thereto, is preferable to be used as the brake B1 and clutches CR and CL. Therefore, by engaging the brake B1 and any of the clutches CR and CL, the torque is transmitted directly to the right rear wheel WRR or the left rear wheel WRL without passing through the double pinion type planetary gear mechanism 5 according to the torque transmission capacity of the engaged brake and clutches. Consequently, the driving force for driving the right rear wheel WRR (or the left rear wheel WRL) is increased so that the power distribution ratio of the differential 4 is changed.

Next, a mechanism for driving a right front wheel WFR and a left front wheel WFL will be explained hereinafter. As shown in FIG. 1, there are provided a motor MR for driving the right front wheel WFR and a motor ML for driving the left front wheel WFL. Therefore, the right front wheel WFR and the left front wheel WFL can be driven independently. In other words, the driving forces for driving the right front wheel WFR and the left front wheel WFL can be controlled independently. Specifically, the motors ML and MR are connected individually with the front wheels WFR and WFL directly or indirectly through an appropriate transmission mechanism to drive the front wheels WFR and WFL separately. In the example shown in FIG. 1, an in-wheel motor is arranged in each front wheel WFR and WFL to serve as the motors MR and ML.

The vehicle is provided with an electronic control unit (i.e., a vehicle ECU) 21 for controlling a behavior of the vehicle, and another electronic control unit (i.e., a differential ECU) 22 for controlling the aforementioned differential 4. Specifically, those electronic control units 21 and 22 are composed mainly of microcomputers adapted to carry out a calculation using data inputted thereto and data stored in advance, thereby outputting a control signal according to the calculation result. For example, a detection signal from a (not shown) steering angle sensor of a steering device 23, a detection signal from a (not shown) torque sensor, and a detection signal from a yaw rate sensor 24 are inputted to the vehicle ECU 21. The vehicle ECU 21 calculates a target yaw moment on the basis of those detection signals, and outputs control signals in accordance with the calculated target yaw moment to the motor MR, the motor ML and the differential ECU 22. For this purpose, the vehicle ECU 21 and the differential ECU 22 are connected with each other to be allowed to exchange data mutually therebetween. Meanwhile, the differential ECU 22 is adapted to control a difference between the drive forces for driving the rear wheels WRR and WRL by the brake B1 and the clutches CR and CL thereby achieving the target yaw moment.

In addition to the aforementioned steering angle, steering torque and yaw rate, the following data is inputted to the vehicle ECU 21 and the differential ECU 22 or stored into those units 21 and 22 in advance. Specifically: a vehicle speed; a steering gear ratio; a slip angle of the case in which the vehicle is making a turn; a damping ratio of the differential 4; a natural frequency of the differential 4; an advancing time constant of the differential 4; a gain of the differential 4; cornering power of the wheels WFR, WFL, WRR and WRL; a distance from the center of the vehicle to a rotational center axis of the front wheels WFR and WFL, and distances from the center of the vehicle to the drive shafts 13 and 14 of the rear wheels WRR and WRL; a yaw inertia moment; a vehicle weight; a radius of a tire of each wheel; a temperature of the oil for engaging the brake B1 and the clutches CR and CL (i.e., an oil temperature); numbers of relative rotation at the clutches CR and CL; temperatures of the motors MR and ML; various kinds of control maps and formulas for determining control amounts of the motors MR and ML and the clutches CR and CL and so on are inputted to the vehicle ECU 21 and the differential ECU 22 or stored therein in advance.

In order to achieve an intentional behavior (especially yaw moment) of the vehicle, the drive force control system of the present invention is adapted to control the driving forces for driving the right and the left wheels or a difference therebetween by the motors MR and ML, and also to control the driving forces for driving the right and the left wheels or a difference therebetween by the differential 4. Specifically, a control delay of the differential 4 as a mechanical unit distributing the torque to the right and the left wheels, or resultant insufficiency of the control is compensated by the aforementioned (in-wheel) motors MR and ML. For this purpose, a target yaw moment is calculated on the basis of the current driving condition or running condition of the vehicle, and an achievable yaw moment by the mechanical unit is also calculated. Then, a difference between those calculated yaw moments is compensated by controlling the in-wheel motors.

Figure 3:
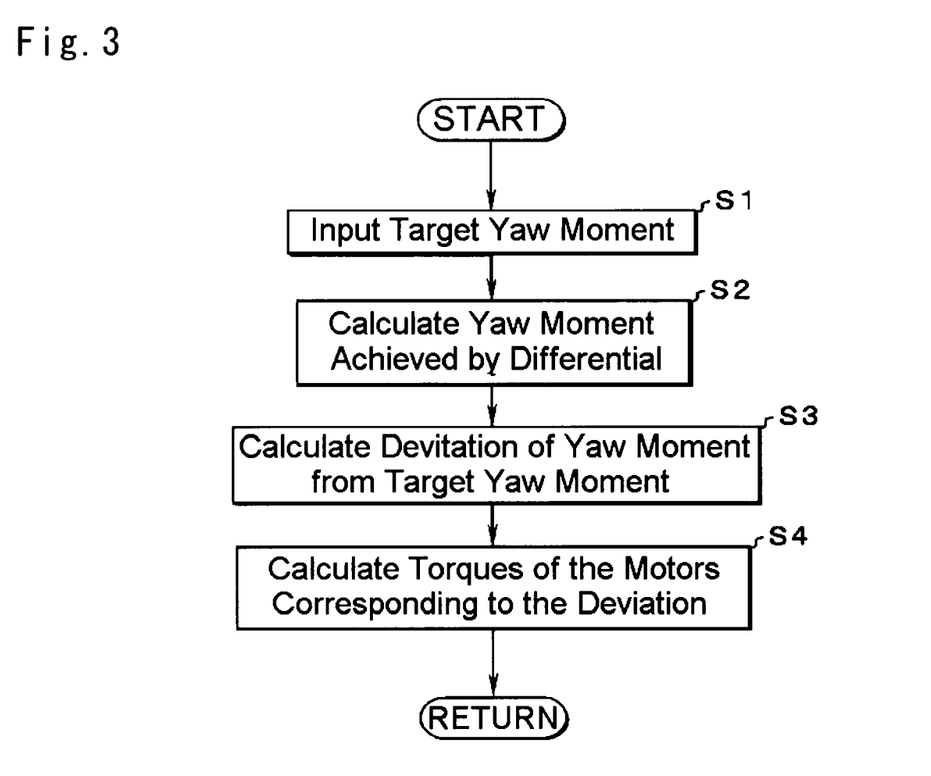
FIG. 3 is a flowchart explaining a control example to be carried out by the drive force control system of the present invention.

FIG. 3 is a flowchart showing an example of the above-explained control. The routine shown in FIG. 3 is carried out repeatedly in a predetermined calculation period $\Delta t$. First of all, a target yaw moment Moreq is inputted (at step S1). For example, in case the vehicle is provided with a four-wheel steering device, the target yaw moment Moreq may be obtained from an ECU for controlling a four-wheel steering. However, various kinds of known methods can be used to calculate the target yaw moment. Specifically, a target yaw rate $\gamma$ ref is calculated first of all by the following formula (1):

$$\gamma_{ref} = \frac{V}{(1 + kh_{ref} \cdot V^2) \cdot L} \frac{\theta}{n} \quad (1)$$

where V represents a vehicle speed, khref represents a target stability factor, L represents a wheelbase, $\theta$ represents a steering angle, and n represents a steering gear ratio.

Then, the target yaw moment Moreq is calculated using the target yaw rate $\gamma$ ref thus calculated. For this purpose, the following formula (2) as an equation of state is set:

$$\begin{bmatrix} \dot{\beta} \\ \dot{\gamma} \end{bmatrix} = \begin{bmatrix} a_{00} & a_{01} \\ a_{10} & a_{11} \end{bmatrix} \begin{bmatrix} \beta \\ \gamma \end{bmatrix} + \begin{bmatrix} b_{00} & b_{01} \\ b_{10} & b_{11} \end{bmatrix} \begin{bmatrix} \theta \\ Moreq \end{bmatrix}. \quad (2)$$

In the above formula (2), $\gamma$ represents a yaw rate, and $\beta$ represents a slip angle of the wheel.

Specifically, a00, a01, a10, a11, b00, and b11 in the above formula (2) are calculated by the following formulas (3):

$$\begin{aligned} a_{00} &= -\frac{2 \cdot (K_f + K_r)}{M \cdot V} & a_{01} &= -\frac{2 \cdot (K_f \cdot L_f + K_r \cdot L_r)}{M \cdot V^2} - 1 \\ a_{10} &= -\frac{2 \cdot (K_f \cdot L_f - K_r \cdot L_r)}{I_z} & a_{11} &= -\frac{2 \cdot (K_f \cdot L_f^2 - K_r \cdot L_r^2)}{I_z V} \\ b_{00} &= \frac{2 \cdot L_f \cdot K_f}{M \cdot V \cdot n} & b_{10} = \frac{2 \cdot K_f}{I_z \cdot n} & b_{11} &= \frac{1}{I_z} \end{aligned} \quad (3)$$

In the above formulas (3), Kf represents a cornering power of the front wheel, Kr represents a cornering power of the rear wheel, Lf represents a distance from a gravity center of the vehicle to a rotational center axis of the front wheel, Lr represents a distance from the gravity center of the vehicle to a shaft center of the drive shafts 13 and 14 of the rear wheels, Iz represents a yaw inertia moment, and M represents a vehicle weight.

Specifically, $\beta$ and $\gamma$ in the above formula (2) are expressed by the following formulas (4):

$$\begin{aligned} \dot{\beta} &= a_{00} \cdot \beta + a_{01} \cdot \gamma + b_{00} \cdot \theta \\ \dot{\gamma} &= a_{10} \cdot \beta + a_{11} \cdot \gamma + b_{10} \cdot \theta + b_{11} \cdot Moreq \end{aligned} \quad (4)$$

Then, as a result of Laplace transformation of the above formulas (4), the following formulas (5) can be obtained:

$$\begin{aligned} (S - a_{00}) \cdot \beta &= a_{01} \cdot \gamma + b_{00} \cdot \theta \\ (S - a_{11}) \cdot \gamma &= a_{10} \cdot \beta + b_{10} \cdot \theta + b_{11} \cdot Moreq \end{aligned} \quad (5)$$

The formulas (5) thus transformed are further transformed into a discrete time function, and the yaw rate $\gamma$ is substituted by the target yaw rate $\gamma$ ref. As a result, the following formula (6) is obtained:

$$\dot{M}oreq = a_{00} \cdot Moreq + \frac{1}{b_{11}} \ddot{\gamma}_{ref} + \frac{(a_{00} + a_{11})}{b_{11}} \cdot \dot{\gamma}_{ref} + \frac{(a_{10} \cdot a_{01} - a_{00} \cdot a_{11})}{b_{11}} \cdot \gamma_{ref} + \frac{b_{10}}{B_{11}} \cdot \dot{\theta} + \frac{(a_{10} \cdot b_{00} - a_{00} \cdot b_{10})}{b_{11}} \cdot \theta. \quad (6)$$

Then, a yaw moment for achieving the calculated target yaw moment Moreq by the differential 4 is calculated (at step S2). Such yaw moment can be calculated using a transfer function of the differential 4, and for example, such transfer function can be calculated by the following formula (7):

$$Modiff = Gdiff \frac{1 + TSS}{1 + 2\frac{\zeta}{\omega}S + \frac{1}{\omega^2}S^2} Moreq. \quad (7)$$

In the above formula (7), Modiff represents a yaw moment generated by the differential 4, ζ represents a damping ratio of the differential 4, ω represents a natural frequency of the differential 4, Gdiff represents a gain of the differential 4, T is a constant of time advance, and S is a Laplace operator.

Then, the above formula (7) is transformed into a discrete time function as expressed by the following formula (8):

$$Modiff(n) = Gdiff \begin{bmatrix} (\Delta t^2 + \Delta tT)Moreq(n) - \\ \frac{\Delta tT Moreq(n-1)}{A} + \\ \frac{BModiff(n-1) - CModiff(n-2)}{A} \end{bmatrix}. \quad (8)$$

$$A = \Delta t^2 + 2\Delta t \frac{\zeta}{\omega} + \frac{1}{\omega^2}$$

$$B = 2\left(\Delta t \frac{\zeta}{\omega} + \frac{1}{\omega^2}\right)$$

$$C = \frac{1}{\omega^2}$$

In the above formula (8), Δt represents a calculation period.

In case of generating a yaw moment by the differential 4, the aforementioned brake B1, and clutches CR and CL are engaged by the hydraulic pressure. Therefore, the yaw moment Modiff calculated by the formula (8) has to be deviated from the target yaw moment Moreq transiently due to a response delay of the differential 4. Such deviation of the yaw moment is calculated at step S3 by the following formula (9):

$$\Delta Moreq = Moreq - Modiff \quad (9)$$

The deviation of the yaw moment ΔMoreq thus calculated using the above formula (9) is a deficiency or insufficiency of the yaw moment due to delay of the differential 4. As described, the drive force control system according to the present invention is adapted to compensate such insufficiency or deficiency of the yaw moment using the motors MR and ML. For this purpose, torques of the motors MR and ML to generate the deviation of the yaw moment ΔMoreq are calculated (at step S4), and then, the routine is returned. Specifically, the torque of each motor MR and ML can be calculated by the following formula:

$$\Delta Moreq = Tf(Ffr - Ffl)/2$$

where Tf represents a tread between the front wheels WFR and WFL, Ffr represents the drive force for driving the right front wheel WFR, and Ffl represents the drive force for driving the left front wheel WFL. A drive force Ff for driving the front wheels WFR and WFL can be calculated from an opening degree of the accelerator, the driving forces for driving the rear wheels WRR and WRL and so on. Specifically, the drive force Ff for driving the front wheels WFR and WFL can be expressed as the following equation:

$$Ft = Ffr + Ffl.$$

Accordingly, the drive forces Ffr and Ffl can be calculated using those formulas. As described, the torques of the motors MR and ML are individually transmitted to each wheel WFR and WFL through the speed reducing mechanism not shown. Specifically, the drive forces Ffr and Ffl can be expressed by the following formulas:

$$Ffr = Tqfr \times n/Rf; \text{ and}$$

$$Ffl = Tqfl \times n/Rf;$$

where Tqfr represents a torque of the right motor MR, Tqfl represents a torque of the left motor ML, n is a torque amplification factor of the speed reducing mechanism, and Rf represents a radius of each wheel MR and ML.

By controlling the motors MR and ML to output the torques thus calculated, insufficiency of the yaw moment generated by the differential 4 with respect to the target yaw moment can be thus compensated using the motors MR and ML. As a result, the total yaw moment of the vehicle is (substantially) conformed to the target yaw moment so that the behavior of the vehicle can be controlled as intended to drive the vehicle stably, even if the control of the differential 4 is delayed inevitably.

In the vehicle shown in FIGS. 1 and 2 thus having the differential 4, the yaw moment is generated by engaging the brake B1, the clutch CR and the clutch CL. However, the torqueses to be generated by those engagement mechanisms have to be restricted by an oil temperature, a temperature of a frictional surface and so on. That is, the target yaw moment may not be achieved always only by controlling the differential 4. In such case, the control system according to the present invention is capable to carry out the control shown in FIG. 4.

The control shown in FIG. 4 will be explained hereinafter in more detail. First of all, as the step S1 of the control shown in FIG. 3, a target yaw moment is inputted (at step S11). Then, it is judged whether or not an oil temperature of the differential 4 is within an allowable range (at step S12). Specifically, the oil temperature of the differential 4 is detected by a sensor, and the detected temperature is judged if it is lower than a permitted value or not. Here, the permitted value is a criterion of the temperature set in advance taking into consideration durability of the oil and sealing member, controllability of the hydraulic pressure and so on.

In case the oil temperature is higher than the permitted value so that the answer of step S12 is NO, the clutches CR, CL and the brake B1 of the differential 4 cannot be engaged. Therefore, the control of the yaw moment using the differential 4 is ceased, and a control of the yaw moment using the motors MR and ML is carried out (at step S13). As described, the relation between the yaw moment Mo and the driving forces Ffr and Ffl for driving both of the front wheels can be expressed by the formula:

$$Mo = Tf(Ffr - Ffl)/2.$$

Therefore, the output torques of the both of the motors MR and ML to achieve the target yaw moment can be calculated based on the fact that a total of the driving forces Ffr and Ffl is equivalent to the drive force for driving the front wheels.

In case the oil temperature of the differential 4 is lower than the permitted value so that the answer of step S12 is YES, it is judged whether or not a below-explained PV value is out of a threshold (at step S14). Here, the PV value is a product obtained by multiplying an engagement pressure of each clutch CR and CL by a rotational speed difference of each clutch CR and CL. The rotational speed difference of each clutch CR and CL can be calculated on the basis of each turning radius of an inner wheel and an outer wheel, a vehicle speed, and a diameter of a tire. Meanwhile, the engagement pressure of each clutch CR and CL can be calculated using the following formula. In other words, a torque difference trq between the right and the left wheels can be expressed as the following formula:

$$Moreq = trq \cdot Rt/2$$

where Rt represents a radius of the tire. Specifically, the torque difference trq between the right and the left wheels can be calculated by the following formula:

$$trq = (prs \cdot A - Fsp) \cdot Rd \cdot \mu \cdot 2 \cdot N$$

where prs represents an oil pressure of the clutch, A represents an area of a piston of an actuator for engaging the clutch CR or CL, Fsp represents an elastic force pushing back the actuator, Rd represents an effective radius of a clutch disc, N represents a number of the clutch discs, and μ represents a frictional coefficient. Accordingly, the oil pressure prs of the clutch can be expressed as the following formula:

$$prs = \{(trq/Rd \cdot \mu \cdot 2 \cdot N) + Fsp\}/A.$$

In case the PV value thus calculated is not out of the threshold so that the answer of step S14 is NO, the differential 4 is controlled to keep the PV value within the threshold, and a delay in the control of the yaw moment by the differential 4 is compensated by the motors MR and ML thereby achieving the target yaw moment (at step S15). Specifically, the control explained with reference to FIG. 3 is carried out at step S15.

To the contrary, in case the PV value is out of the threshold so that the answer of step S14 is YES, the control of the yaw moment using the differential 4 is no longer possible to be carried out. Therefore, it is judged whether or not the temperatures of the motors MR and ML are within the allowable range (at step S16). Durability of the motors MR and ML may be degraded with a rise in the temperatures thereof due to a Joule heat, a frictional heat etc. For this reason, the temperature to ensure the performance of those motors is set in advance. Accordingly, at step S16, it is judged whether or not the temperatures of the motors MR and ML are lower than such predetermined temperature. In case the answer of step S16 is NO, the control of the yaw moment using the motors MR and ML cannot be carried out neither. In this case, therefore, the control of the yaw moment using the differential 4 is ceased, and the compensation of the yaw moment using the motors MR and ML will not be carried out (at step S17). To the contrary, in case the temperatures of the motors MR and ML are within the allowable range so that the answer of step S16 is YES, the control the yaw moment using the differential 4 is ceased, and a control to achieve the target yaw moment using the motors MR and ML is carried out instead (at step S18).

Figure 4:
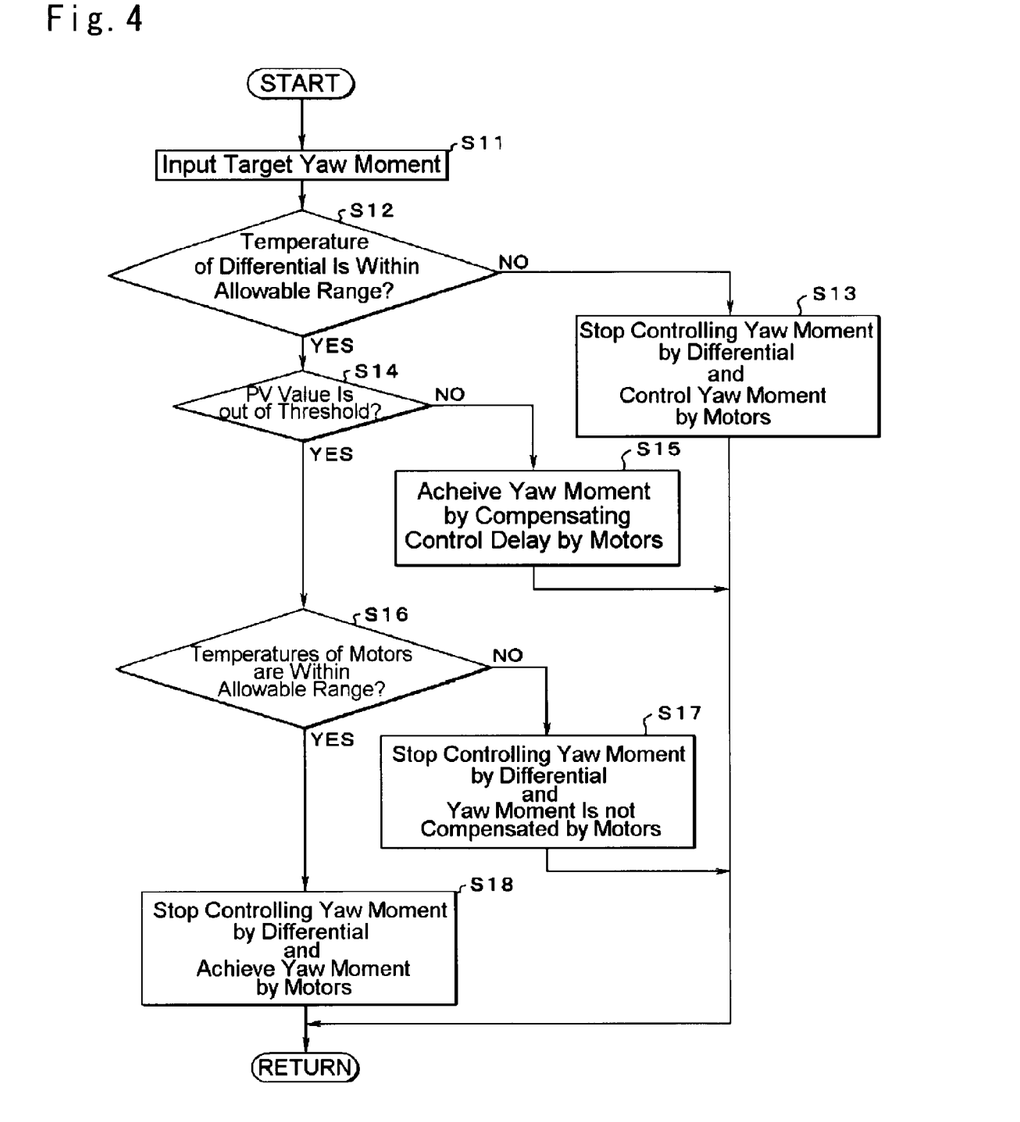
FIG. 4 is a flowchart explaining another control example to be carried out by the drive force control system of the present invention.

Thus, according to the control system of the present invention, the control of the yaw moment can be carried out using the motors MR and ML as explained in FIG. 4, even in case the control of the yaw moment using the differential 4 cannot be carried out due to trouble of the differential 4 or the like. That is, such function serves as a fail safe.

Figure 5:
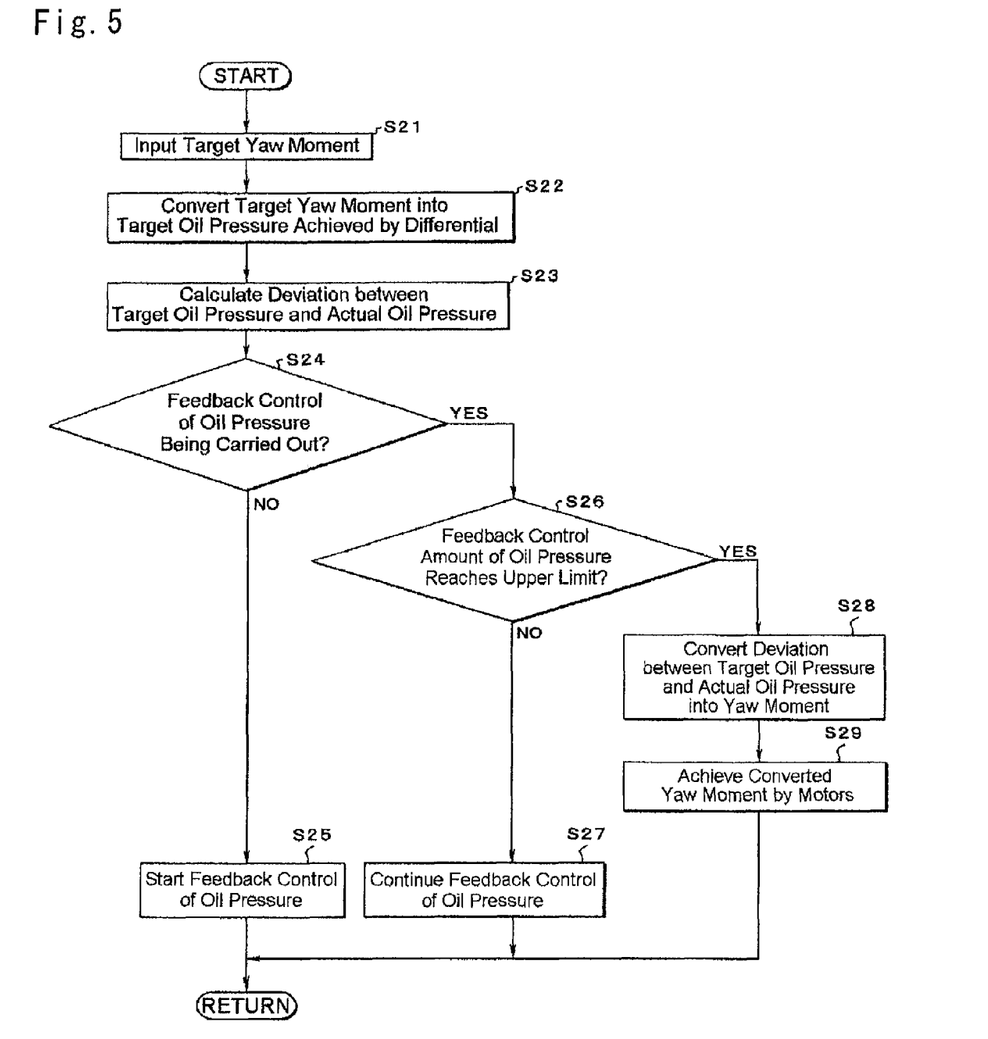
FIG. 5 is a flowchart explaining still another control example to be carried out by the drive force control system of the present invention.

Meanwhile, the oil pressure for controlling the clutches CR and CL may be dropped or restricted relatively by some kinds of reasons, e.g., troubles of a not shown hydraulic pump or hydraulic control unit and so on. In this case, the control system according to the present invention is capable of carrying out a control shown in FIG. 5. Specifically, FIG. 5 shows an example of a control for the case of carrying out a feedback control of the oil pressures of the clutches CR and CL, and a control amount thereof exceeds a predetermined upper limit. As the controls shown in FIGS. 3 and 4, first of all, a target yaw moment is inputted (at step S21). Then, the target yaw moment is converted into a target oil pressure for the case of achieving the target yaw moment by the differential 4 (at step S22). Specifically, the target oil pressure can be calculated using the aforementioned formula expressing the relation between the torque difference trq of the right and the left wheels and the target yaw moment Moreq, and the formula expressing the relation between the torque difference trq and the oil pressure prs of the clutch.

Next, a deviation between the target oil pressure and an actual oil pressure detected by a hydraulic sensor or the like is calculated (at step S23). Then, it is judged whether or not the feedback control of the oil pressure is being carried out (at step S24). In case the feedback control of the oil pressure is not being carried out so that the answer of step S24 is NO, a feedback control using the deviation calculated at step S23 is carried out (at step S25).

To the contrary, in case the feedback control of the oil pressure has already been carried out so that the answer of step S24 is YES, it is judged whether or not the control amount of the feedback control of the oil pressure based on the deviation reaches an upper limit (at step S26). In case the answer of step S26 is NO, that is, in case the control amount of the feedback control is within an allowable range, the feedback control of the oil pressure is continued (at step S27). To the contrary, in case the control amount of the feedback control reaches the upper limit so that the answer of step S26 is YES, the deviation between the target oil pressure and the actual oil pressure calculated at step S23 is converted into a yaw moment (at step S28). Thus, a conversion carried out at step S28 is an opposite conversion of step S22 for converting the target yaw moment into the target oil pressure. Therefore, the conversion of step S28 can be carried out using the aforementioned formula. Alternatively, the yaw moment may also be calculated at step S28 using an inverted map prepared in advance. Then, the motors MR and ML are controlled to achieve the yaw moment corresponding to the deviation of the oil pressure (at step S29). Specifically, the yaw moment is converted into the motor torque, and the motors MR and ML are controlled to output the torques thus converted. Here, such conversion of the yaw moment into the motor torque can be carried out in the same way as the aforementioned control carried out at step S4 shown in FIG. 3.

Thus, as shown in FIG. 5, the control system of the present invention is capable of conforming or approximating the yaw moment or yaw rate of the vehicle to the target value entirely by differentiating the drive forces for driving the light and the left wheels using the motors MR and ML, even in case the yaw moment cannot be controlled sufficiently by the differential 4 due to a limitation of the oil pressure. Therefore, according to the control system of the present invention, the control of the yaw moment can be carried out certainly with a good response. For this reason, behavior of the vehicle can be stabilized, and in addition, riding comfort and drivability can be improved.

Here will be explained a relation between the example thus has been explained and the present invention. The functional means for carrying out steps S1, S11 and S21 corresponds to the "means which calculates a target yaw moment" of the present invention; the functional means for carrying out steps S4, S18 and S29 corresponds to the "means which differentiates the drive forces" of the present invention; the functional means for carrying out step S3 corresponds to the "means which calculates a deficiency of a difference between the drive forces" of the present invention; the functional means for carrying out step S4 corresponds to the "means which sets the difference between the drive forces" of the present invention; and the functional means for carrying out step S29 corresponds to the "means which differentiates the drive forces" of the present invention.

Although the vehicle thus has been explained in the example is structured to drive the rear wheels by the power of the engine and each of the front wheels is provided individually with the motor, the control system according to the present invention may also be applied to a vehicle in which the rear wheels are driven by the motors and the power of the engine is transmitted to the front wheels. In addition, the aforementioned formulas are merely an example of the formulas to carry out the control of the present invention, and different kinds of formulas may also be used in the present invention. Alternatively, the control of the present invention may also be carried out using map values calculated in advance.

The invention claimed is:

1. A drive force control system for a vehicle having a pair of front wheels and a pair of rear wheels, comprising:
    a distribution mechanism, which distributes power outputted from a prime mover to a right wheel and to a left wheel of said pair of rear wheels, and which changes a distribution ratio of the power to those right and left rear wheels by engaging or disengaging an engagement mechanism to change a drive force for driving the right and left rear wheels;
    a first motor connected to a right wheel of the pair of front wheels to control drive force for driving the right front wheel and a second motor connected to a left wheel of the pair of front wheels to control drive force for driving the left front wheel;
    a means which calculates a target yaw moment of the vehicle;
    a means which calculates an achievable yaw moment of the vehicle based on a difference between the drive forces for driving the right and the left rear wheels due to a delay in changing such a difference therebetween by actuating the engagement mechanism;
    a means which calculates a difference between the achievable yaw moment and the target yaw moment of the vehicle; and
    a means which sets a difference between the drive forces of the motors for driving the right and the left front wheels to compensate for the calculated difference and to achieve the target yaw moment of the vehicle.

2. The drive force control system as claimed in claim 1, wherein:
    the motors include an in-wheel motor, which is arranged individually in the right and the left front wheels to drive those wheels directly.

3. The drive force control system as claimed in claim 2, further comprising:
    a means which differentiates the drive forces for driving the right and the left front wheels by the motors thereby approximating an actual yaw moment to the calculated target yaw moment.

4. The drive force control system as claimed in claim 2, wherein:
    the means which calculates the difference between the drive forces for driving the right and the left rear wheels resulting from a delay in changing such a difference therebetween includes a means which calculates a yaw moment corresponding to a difference between the target yaw moment of the vehicle and a yaw moment achieved using the distribution mechanism by actuating the engagement mechanism to achieve the target yaw moment.

5. The drive force control system as claimed in claim 2, further comprising:
    a means which differentiates the drive forces for driving the right and the left front wheels to achieve the target yaw moment by the motors instead of or in addition to the distribution mechanism, in case the calculated target yaw moment is larger than a yaw moment settable by differentiating the driving forces for driving the right and the left rear wheels using the distribution mechanism.

6. The drive force control system as claimed in claim 1, further comprising:
    a means which differentiates the drive forces for driving the right and the left front wheels by the motors thereby approximating an actual yaw moment to the calculated target yaw moment.

7. The drive force control system as claimed in claim 1, wherein:
    the means which calculates the difference between the drive forces for driving the right and the left rear wheels resulting from a delay in changing such a difference therebetween includes a means which calculates a yaw moment corresponding to a difference between the target yaw moment of the vehicle and a yaw moment achieved using the distribution mechanism by actuating the engagement mechanism to achieve the target yaw moment.

8. A drive force control system for a vehicle having a pair of front wheels and a pair of rear wheels, comprising:
    a distribution mechanism, which distributes power outputted from a prime mover to a right wheel and to a left wheel of said pair of rear wheels to generate a yaw rate in a positive manner, and which changes a distribution ratio of the power to those right and left rear wheels by engaging or disengaging an engagement mechanism;
    a first motor connected to a right wheel of the pair of front wheels to control drive force for driving the right front wheel and a second motor connected to a left wheel of the pair of front wheels to control drive force for driving the left front wheel;
    a means which calculates a target yaw moment of the vehicle; and
    a means which differentiates the drive forces for driving the right and the left front wheels to achieve the target yaw moment by the motors instead of or in addition to the distribution mechanism, in case the calculated target yaw moment is larger than a yaw moment settable by differentiating the driving forces for driving the right and the left rear wheels using the distribution mechanism.

* * * * *